(12) United States Patent
Huke et al.

(10) Patent No.: US 11,282,345 B1
(45) Date of Patent: Mar. 22, 2022

(54) PLAYER FOCUSED WAGERING SYSTEM

(71) Applicant: AdrenalineIP, Washington, DC (US)

(72) Inventors: Casey Alexander Huke, Washington, DC (US); Joseph W. Beyers, Saratoga, CA (US); Michael D'Andrea, Burlington, VT (US)

(73) Assignee: AdrenalineIP, Washington, DC (US)

( * ) Notice: Subject to any disclaimer, the term of this patent is extended or adjusted under 35 U.S.C. 154(b) by 0 days.

(21) Appl. No.: 17/070,118

(22) Filed: Oct. 14, 2020

Related U.S. Application Data (60) Provisional application No. 63/081,561, filed on Sep. 22, 2020.

(51) Int. Cl.
*G07F 17/32* (2006.01)
*G06F 16/783* (2019.01)
*G06K 9/00* (2022.01)

(52) U.S. Cl.
CPC ........ *G07F 17/3288* (2013.01); *G07F 17/323* (2013.01); *G07F 17/3223* (2013.01); *G06F 16/7837* (2019.01); *G06K 9/00342* (2013.01); *G06K 9/00664* (2013.01)

(58) Field of Classification Search
CPC . G07F 17/3288; G07F 17/3223; G07F 17/323
See application file for complete search history.

(56) References Cited

U.S. PATENT DOCUMENTS

| | | | |
|---|---|---|---|
| 8,821,269 | B2 | 9/2014 | Storm et al. |
| 2018/0005492 | A1* | 1/2018 | Hall .................... G07F 17/3223 |
| 2019/0213404 | A1* | 7/2019 | Wnuk ............... G06F 16/24578 |
| 2019/0392684 | A1 | 12/2019 | McDonald et al. |
| 2020/0111325 | A1 | 4/2020 | Lockton et al. |
| 2020/0133452 | A1* | 4/2020 | Gupta ...................... G06N 5/04 |
| 2020/0151997 | A1* | 5/2020 | Danielson ............. G07F 17/323 |

\* cited by examiner

*Primary Examiner* — Corbett B Coburn
(74) *Attorney, Agent, or Firm* — Maier & Maier, PLLC (57) ABSTRACT

A system for player focused play by play wagering on live sporting events in which users identify favorite players and a wagering network offers that user player focused wagering opportunities and allow the user to build upon that wager with new player focused wagering opportunities that are based upon their previous wagering selections.

14 Claims, 3 Drawing Sheets

Tiered Wagering Module Object Content

Fig. 1 Content - High Level Diagram

| User ID | Device ID | Wager History | Wallet Balance | Favorites |
|---|---|---|---|---|
| Joe Smith | 1234 | JSWH.dat | $500 | Favorites.Joe.Smith.dat |
| Robert Jones | 2345 | RJWH.dat | $1,250 | Favorites.Robert.Jones.dat |
| Susan Rice | 3456 | SRWH.dat | $10 | Favorites.Susan.Rice.dat |
| ... | | | | |
| Mike Baker | 8791 | MBWH.dat | $200 | Favorites.Mike.Baker.dat |

Fig. 2 User Database Data Content

Fig. 3 Wagering Module Object Content

Fig. 4 Favorites Module Object Content

Fig. 5 Tiered Wagering Module Object Content

| Sport | Player Type | Tier 1 Wager | Tier 1 Answer | Tier 2 Wager | Tier 2 Answer | Tier 3 Wager |
|---|---|---|---|---|---|---|
| NFL | Receiver | Catch Y/N | Catch Yes | Yards O/U | Over | Touchdown Y/N |
| NFL | Receiver | Catch Y/N | Catch Yes | Yards O/U | Under | N/A |
| NFL | Receiver | Catch Y/N | Catch No | N/A | N/A | N/A |
| NFL | Running Back | Catch or Carry | Catch | Yards 1 O/U | Over | Touchdown Y/N |
| NFL | Running Back | Catch or Carry | Catch | Yards 1 O/U | Under | N/A |
| NFL | Running Back | Catch or Carry | Carry | Yards 2 O/U | Over | Touchdown Y/N |
| NFL | Running Back | Catch or Carry | Carry | Yards 2 O/U | Under | N/A |
| ... | | | | | | |
| MLB | Hitter | Contact/No Contact | Contact | Hit/Out | Hit | Single/Extra-Base Hit |
| MLB | Hitter | Contact/No Contact | Contact | Hit/Out | Out | Groundout/Flyout |
| MLB | Hitter | Contact/No Contact | No Contact | Strikeout/Walk | Stikeout | Looking/Swinging |
| MLB | Hitter | Contact/No Contact | No Contact | Strikeout/Walk | Walk | N/A |

Fig. 6 Tier Database Data Content

PLAYER FOCUSED WAGERING SYSTEM

CROSS-REFERENCE TO RELATED APPLICATIONS

The present patent application claims benefit and priority to U.S. Provisional Patent Application No. 63/081,561 entitled "PLAYER FOCUSED WAGERING SYSTEM" filed on Sep. 22, 2020 which is hereby incorporated by reference into the present disclosure.

FIELD

The embodiments are generally related to play by play wagering on live sporting events focused on individual players.

BACKGROUND

Current sports betting platforms provide numerous different ways to wager on entire sporting events, or individual aspects or portions of those events. The number of these options continues to increase, making it difficult for a user to know how best wager on sports. Being overwhelmed with options can lead to users making poor bets and becoming discouraged with the process.

Sports fandom has shifted recently with fans being more attached to a particular player than any one team, making it more difficult to deliver content that will maintain their engagement.

SUMMARY

Embodiments can include various methods, systems, and apparatuses for wagering. One embodiment includes a system for wagering on multiple elements of a single play of a live sporting event related to a player of interest, including: a wagering network that hosts in-play wagering on live sporting events; and a user database with user preferences; odds for wagers are available on multiple potential outcomes for single plays inside of a live sporting event; and wagers are offered on the wagering network on potential outcomes for a favorite player in a play of a live sporting event.

Another exemplary embodiment includes a computer implemented method for providing wagering on multiple elements of a single play of a live sporting event related to a player of interest, including executing on a processor the steps of: displaying a gambling game on a device; displaying one or more favorite players or, if there are no favorite players, prompting a selection of one or more favorite players; displaying one or more first wager options for at least one favorite player in play in a live sporting event; and displaying one or more wagers placed on the at least one favorite player in the play in the live sporting event.

BRIEF DESCRIPTIONS OF THE DRAWINGS

The accompanying drawings illustrate various embodiments of systems, methods, and various other aspects of the embodiments. Any person with ordinary skills in the art will appreciate that the illustrated element boundaries (e.g. boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention As used herein, the word exemplary means serving as an example, instance or illustration. The embodiments described herein are not limiting, but rather are exemplary only. It should be understood that the described embodiments are not necessarily to be construed as preferred or advantageous over other embodiments. Moreover, the terms embodiments of the invention, embodiments or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, hit, performed by a participant in a sporting event. In some embodiments, an action may be a strategic decision made by a participant in the sporting event such as a player, coach, management, etc. In some embodiments, an action may be a penalty, foul, or type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity on the basis of the outcome of a future event, such as the results of a game or event. It may be understood that non-monetary items may be the subject of a "bet" or "wager" as well, such as points or anything else that can be quantified for a "wager" or "bet." A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be done for certain amount or for a future time. A "bet" or "wager" can be done for being able to answer a question correctly. A "bet" or "wager" can be done within a certain period of time. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain for the purpose of placing bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sports book has reduced its betting limits, usually because of weather or the uncertain status of injured players is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides", "favorite", "chalk", "circled game", "laying the points price", "dog" and "underdog" can be integrated into the embodiments in a variety of manners.

The "money line" refers to the odds expressed in terms of money. With money odds, whenever there is a minus (−) the player "lays" or is "laying" that amount to win (for example $100); where there is a plus (+) the player wins that amount for every $100 wagered. A "straight bet" refers to an individual wager on a game or event that will be determined by a point spread or money line. The term "straight-up" means winning the game without any regard to the "point spread"; a "money-line" bet. "Money line", "straight bet", "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread". A handicap of the "point spread" value is given to the favorite team so bettors can choose sides at equal odds. "Cover the spread" means that a favorite win an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread". The "opening line" means the earliest line posted for a particular sporting event or game. The term "pick" or "pick 'em" refers to a game when neither team is favored in an event or game. "Line", "cover the spread", "cover", "tie", "pick" and "pick-em" can be integrated into the embodiments in a variety of manners.

To "middle" means to win both sides of a game; wagering on the "underdog" at one point spread and the favorite at a different point spread and winning both sides. For example, if the player bets the underdog +4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules, in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. Event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total", "over", and "under" can be integrated into the embodiments in a variety of manners.

A "parlay" is a single bet that links together two or more wagers; to win the bet, the player must win all the wagers in the "parlay". If the player loses one wager, the player loses the entire bet. However, if he wins all the wagers in the "parlay", the player wins a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay", "round robin", "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events, typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both of the pitchers scheduled to start a game actually start. If they don't, the bet is deemed "no action" and refunded. The "run line" in baseball, refers to a spread used instead of the money line. "Listed pitchers" and "no action" and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle", "juice", vigorish", "vig" and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations or individual that would deploy, for fees, and may be part of, of perform, various system elements or method steps in the embodiments.

Managed service user interface service is a service that can help customers (1) manage third parties, (2) develop the web, (3) do data analytics, (4) connect thru application program interfaces and (4) track and report on player behaviors. A managed service user interface can be integrated into the embodiments in a variety of manners.

Managed service risk management services are a service that assists customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling and (4) customer service assistance. These managed service compliance services can be integrated into the embodiments in a variety of manners.

Managed service pricing and trading service is a service that helps customers with (1) official data feeds, (2) data visualization and (3) land based, on property digital signage. These managed service pricing and trading services can be integrated into the embodiments in a variety of manners.

Managed service and technology platform are services that helps customers with (1) web hosting, (2) IT support and (3) player account platform support. These managed service and technology platform services can be integrated into the embodiments in a variety of manners.

Managed service and marketing support services are services that help customers (1) acquire and retain clients and users, (2) provide for bonusing options and (3) develop press release content generation. These managed service and marketing support services can be integrated into the embodiments in a variety of manners.

Payment processing services are those services that help customers that allow for (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat your players to free bets, odds boosts, enhanced access and flexible cashback to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by managing commission and availability at all times. The "cash out" or "pay out" or "payout" can be integrated into the embodiments in a variety of manners, including both monetary and non-monetary payouts, such as points, prizes, promotional or discount codes, and the like.

"Customized betting" allow customers to have tailored personalized betting experiences with sophisticated tracking and analysis of players' behavior. "Customized betting" can be integrated into the embodiments in a variety of manners.

Kiosks are devices that offer interactions with customers clients and users with a wide range of modular solutions for both retail and online sports gaming. Kiosks can be integrated into the embodiments in a variety of manners.

Business Applications are an integrated suite of tools for customers to manage the everyday activities that drive sales, profit, and growth, from creating and delivering actionable insights on performance to help customers to manage the sports gaming. Business Applications can be integrated into the embodiments in a variety of manners.

State based integration allows for a given sports gambling game to be modified by states in the United States or countries, based upon the state the player is in, based upon mobile phone or other geolocation identification means.

State based integration can be integrated into the embodiments in a variety of manners.

Game Configurator allow for configuration of customer operators to have the opportunity to apply various chosen or newly created business rules on the game as well as to parametrize risk management. Game configurator can be integrated into the embodiments in a variety of manners.

"Fantasy sports connector" are software connectors between method steps or system elements in the embodiments that can integrate fantasy sports. Fantasy sports allow a competition in which participants select imaginary teams from among the players in a league and score points according to the actual performance of their players. For example, if a player in a fantasy sports is playing at a given real time sports, odds could be changed in the real time sports for that player.

Software as a service (or SaaS) is a method of software delivery and licensing in which software is accessed online via a subscription, rather than bought and installed on individual computers. Software as a service can be integrated into the embodiments in a variety of manners.

Synchronization of screens means synchronizing bets and results between devices, such as TV and mobile, PC and wearables. Synchronization of screens can be integrated into the embodiments in a variety of manners.

Automatic content recognition (ACR) is an identification technology to recognize content played on a media device or present in a media file. Devices containing ACR support enable users to quickly obtain additional information about the content they see without any user-based input or search efforts. To start the recognition, a short media clip (audio, video, or both) is selected. This clip could be selected from within a media file or recorded by a device. Through algorithms such as fingerprinting, information from the actual perceptual content is taken and compared to a database of reference fingerprints, each reference fingerprint corresponding to a known recorded work. A database may contain metadata about the work and associated information, including complementary media. If the fingerprint of the media clip is matched, the identification software returns the corresponding metadata to the client application. For example, during an in-play sports game a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet" which is a computer-generated data point is placed above the player that is bet on. Augmented reality can be integrated into the embodiments in a variety of manners.

Some embodiments of this disclosure, illustrating all its features, will now be discussed in detail. It can be understood that the embodiments are intended to be open ended in that an item or items used in the embodiments is not meant to be an exhaustive listing of such item or items, or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

Figure 1:
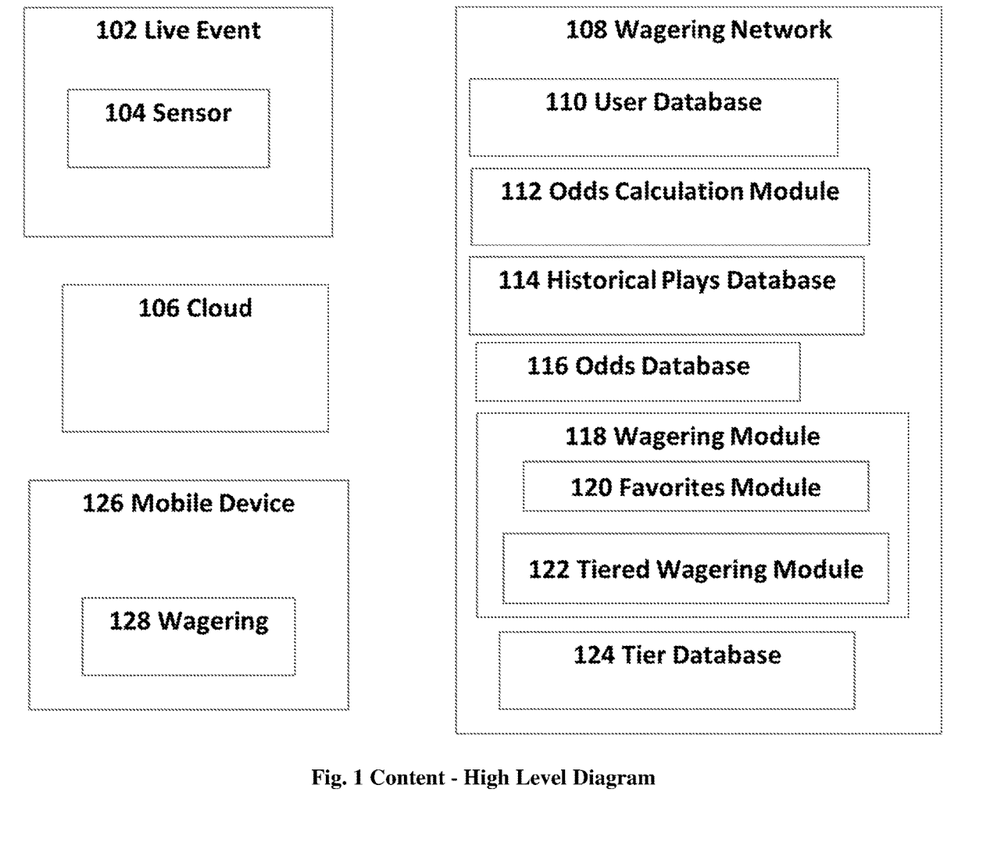
FIG. 1 illustrates a player focused wagering system, according to an embodiment.

FIG. 1 is a system for a player focused wagering system. This system may include a live event 102, for example a sporting event such as a football game, basketball game, baseball game, hockey game, tennis match, golf tournament, eSports or digital game, etc. The live event 102 will include some number of actions or plays, upon with a user or bettor or customer can place a bet or wager, typically through an entity called a sportsbook. There are numerous types of wagers the bettor can make, including, a straight bet, a money line bet, a bet with a point spread or line that bettor's team would need to cover, if the result of the game with the same as the point spread the user would not cover the spread, but instead the tie is called a push. If the user is betting on the favorite, they are giving points to the opposing side, which is the underdog or longshot. Betting on all favorites is referred to as chalk, this is typically applied to round robin, or other styles of tournaments. There are other types of wagers, including parlays, teasers and prop bets, that are added games, that often allow the user to customize their betting, by changing the odds and payouts they receive on a wager. Certain sportsbooks will allow the bettor to buy points, to move the point spread off of the opening line, this will increase the price of the bet, sometimes by increasing the juice, vig, or hold that the sportsbook takes. Another type of wager the bettor can make is an over/under, in which the user bets over or under a total for the live event, such as the score of American football or the run line in baseball, or a series of action in the live event. Sportsbooks have a number of bets they can handle, a limit of wagers they can take on either side of a bet before they will move the line or odds off of the opening line. Additionally, there are circumstance, such as an injury to an important player such as a listed pitcher, in which a sportsbook, casino or racino will take an available wager off the board. As the line moves there becomes an opportunity for a bettor to bet on both sides at different point spreads in order to middle and win both bets. Sportsbooks will often offer bets on portions of games, such as first half bets and half-time bets. Additionally, the sportsbook can offer futures bets on live events 102 in the future. Sportsbooks need to offer payment processing services in order to cash out customers. This can be done at kiosks at the live event or at another location.

Further, embodiments may include a plurality of sensors 104 that may be used such as motion sensors, temperature sensors, humidity sensors, cameras such as an RGB-D camera which is a digital camera capable of capturing color (RGB) and depth information for every pixel in an image, microphones, radiofrequency receiver, a thermal imager, a radar device, a lidar device, an ultrasound device, a speaker, wearable devices etc. Also, the plurality of sensors may include tracking devices, such as RFID tags, GPS chips or other such devices embedded on uniforms, in equipment, in the field of play, in the boundaries of the field of play, or other markers on the field of play. Imaging devices may also be used as tracking devices such as player tracking that provides statistical information through real-time X, Y positioning of players and X, Y, Z positioning of the ball.

Further, embodiments may include a cloud 106 or communication network that may be a wired and/or a wireless network. The communication network, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR)

communication, Public Switched Telephone Network (PSTN), Radio waves, and other communication techniques known in the art. The communication network may allow ubiquitous access to shared pools of configurable system resources and higher-level services that can be rapidly provisioned with minimal management effort, often over the Internet and relies on sharing of resources to achieve coherence and economies of scale, like a public utility, while third-party clouds allow organizations to focus on their core businesses instead of expending resources on computer infrastructure and maintenance. The cloud 106 may be communicatively coupled to wagering network 108 which may perform real time analysis on the type of play and the result of the play. The cloud 106 may also be synchronized with game situational data, such as the time of the game, the score, location on the field, weather conditions, and the like which may affect the choice of play utilized. For example, in other exemplary embodiments, the cloud 106 may not receive data gathered from sensors 104 and may, instead, receive data from an alternative data feed, such as SportsRadar®. This data may be compiled substantially immediately following the completion of any play and the data from this feed may be compared with a variety of team data and league data based on a variety of elements, including down, possession, score, time, team, and so forth, as described in various exemplary embodiments herein.

Further, embodiments may include a wagering network 108 which may perform real time analysis on the type of play and the result of a play or action. The wagering network 108 (or cloud 106) may also be synchronized with game situational data, such as the time of the game, the score, location on the field, weather conditions, and the like which may affect the choice of play utilized. For example, in other exemplary embodiments, wagering network 108 may not receive data gathered from sensors 104 and may, instead, receive data from an alternative data feed, such as SportsRadar®. This data may be compiled substantially immediately following the completion of any play and the data from this feed may be compared with a variety of team data and league data based on a variety of elements, including down, possession, score, time, team, and so forth, as described in various exemplary embodiments herein. The wagering network can offer a number of software as a service managed services such as, user interface service, risk management service, compliance, pricing and trading service, IT support of the technology platform, business applications, game configuration, state based integration, fantasy sports connection, integration to allow the joining of social media, as well as marketing support services that can deliver engaging promotions to the user.

Further, embodiments may include a user database 110 which contains data relevant to all users of the system, which may include a user ID of the user, a device identifier for their mobile device 126, a list of the players indicated as favorites by the user through the favorites module 120, and could also include wagering history on the user, and other relevant user data.

Further, embodiments may include an odds calculation module 112 which utilizes historical play data to calculate odds for in-play wagers.

Further, embodiments may include a historical plays database 114, that contains play data for the type of sport being played in live event 102. For example, in American football for optimal odds calculation, the historical play data should include meta data about the historical plays, such as time, location, weather, previous plays, opponent, physiological data, etc.

Further, embodiments may include an odds database 116 that contains the odds calculated by the odds calculation module to display the odds the user's mobile device 126 and to take bets from the user through the mobile device wagering app 128.

Further, embodiments may include a wagering module 118 that allows the user to place wagers on individual plays inside of the live event 102 through the wagering app 128. The wagering module 118 will allow the user to indicate favorite players and prompt the favorites module 120 if the user gives that indication. The wagering module 118 displays the available wagers related to at least one of the user's indicated favorite players from the odds database 116 on the mobile device 126. A player indication of a wager on one of the presented wager options will prompt the tiered wagering module 122 to allow the user to build a question-based parlay. Once a wager is placed, the live event 102 is monitored for the end of the play, in this example the whistle of the referee in an America football game. The actual play result is compared to the wager. The play result, wager, wager amount, and odds are then used calculate the adjustment to the user's wallet information in the user database 110. The wagering app 128 is then monitored for more wagers until the user logs off or the live event 102 is complete.

Further, embodiments may include a favorites module 120 that allows users to indicate player(s) they have a greater interest in wagering on. 120. Further, embodiments may include a tiered wagering module 122 that allows the user to build their initial wager into a parlay with a serious of additional wager offers, in which the additional wagers offered are based upon the previous wager response as per the rules in the tier database 122.

Further, embodiments may include a tier database 124 that contains the rules used by the tiered wagering module 122 in determining which wager to display for the user based upon the previous wager response.

Further, embodiments may include a mobile device 126 such as a computing device, laptop, smartphone, tablet, computer, smart speaker, or I/O devices. I/O devices may be present in the computing device. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers. Devices may include a combination of multiple input or output devices, including, e.g., Microsoft KINECT, Nintendo Wii mote for the WIT, Nintendo WII U GAMEPAD, or Apple IPHONE. Some devices allow gesture recognition inputs through combining some of the inputs and outputs. Some devices allow for facial recognition which may be utilized as an input for different purposes including authentication and other commands. Some devices allow for voice recognition and inputs, including, e.g., Microsoft KINECT, SIRI for IPHONE by Apple, Google Now or Google Voice Search. Additional user devices have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices, display devices or group of devices may be augmented reality devices. The I/O devices may be controlled by an I/O controller. The I/O controller may control one or more I/O devices, such as, e.g., a keyboard and a pointing device, e.g., a mouse or optical pen. Furthermore, an I/O device may also contain storage and/or an installation medium for the computing device. In still other embodiments, the computing device may include USB connections (not shown) to receive handheld USB storage devices. In further embodiments, an I/O device may be a bridge between the system bus and an external communication bus, e.g. a USB bus, a SCSI bus, a FireWire bus, an Ethernet bus, a Gigabit Ethernet bus, a Fiber Channel bus, or a Thunderbolt bus. In some embodiments the mobile device 126 could be an optional component and would be utilized in a situation in which a paired wearable device is utilizing the mobile device 126 as additional memory or computing power or connection to the internet.

Further, embodiments may include a wagering app 128, which is a program that enables the user to place bets on individual plays in the live event 102, and display the audio and video from the live event 102, along with the available wagers on the mobile device 126. The wagering app 128 allows the user to interact with the wagering network 108 in order to place bets and provide payment/receive funds based on wager outcomes.

Figure 2:
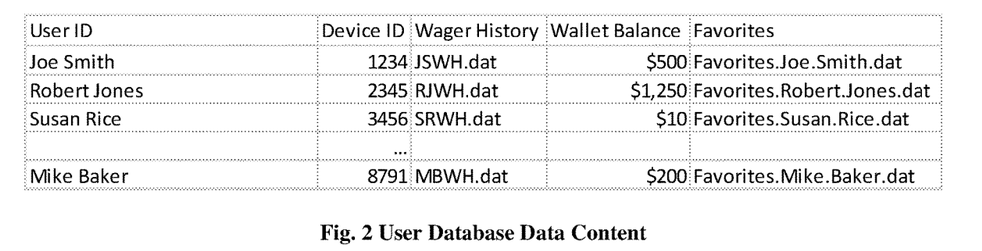
FIG. 2 illustrates a user database, according to an embodiment.

FIG. 2 illustrates the user database 102. The database contains information about all of the users of the wagering network 108. This information includes, but is not limited to, a user identification, which is the user's name in this example but could also be any other kind of alphanumeric identification. A device identification, for the mobile device 126 on which the wagering app 128 is installed. The user's wager history, which is a data file in this example. The user's current wallet/account balance, in this example the balance is in US dollars, but the system could use other currencies or non-monetary prizes such as points. The favorite player(s) indicated by each user through the favorites module 120.

Figure 3:
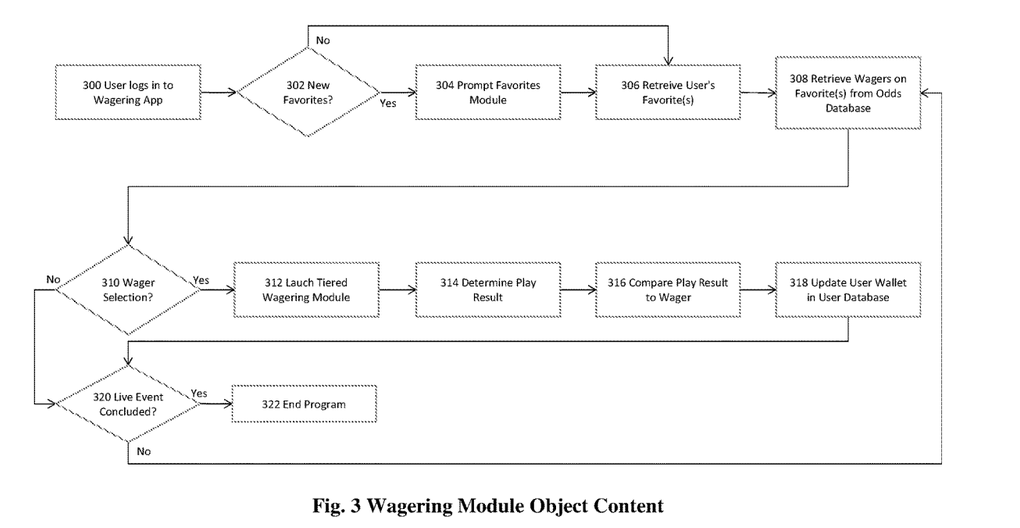
FIG. 3 illustrates a wagering module, according to an embodiment.

FIG. 3 illustrates the wagering module 118. The process begins with the user logging into the wagering app 128, at step 300. The user can then indicate, at step 302, that they wish to add or change a player or players on their favorites list. If the user indicates, at step 302, that they want to add or change to their favorites list, the favorites module 120 is prompted, at step 304. The favorites module 120 is automatically prompted, at step 304, if the user has not previously used the favorites module 120. Once the favorites module 120 has run, or if the user does not elect to make changes to their favorites list at step 302, the module then retrieves, at step 306, the user's favorites list from the user database 110. Wagers available for plays in the live event 102 are retrieved, at step 308, from the odds database 116 and filtered for wagers that are applicable to at least one player on the user's favorites list. For example, user Joe Smith has Atlanta Falcons wide receiver Julio Jones as one of his indicated favorite players. There are wagers available on the next play that are applicable to Julio Jones as well as the running back, the tight end, the second wide receiver and the opposing team's defense. In this example, user Joe Smith would only see the tier 1 wagers available on Julio Jones, which is a yes/no on if he will catch a pass on the next play. The wagering module 118 then polls, at step 310 for the user's wager selection. If no wager selection is received at step 310, the wagering module 118 proceeds to step 320 to determine if the live event 102 is complete. If the user makes a wager selection at step 310, the tiered wagering module 122 is prompted, at step 312. Once the player's wager is completed through the tiered wagering module 122, the live event 102 is monitored to determine, at step 314, the result of the play. The actual result of the play is compared, at step 316, to the wagered upon result. In this example the user Joe Smith wagered that Julio Jones would catch a pass, that it would be for more than 10 yards and he would not score a touchdown. The actual result of the play was a completed pass to Julio Jones for 14 yards, and no touchdown. In this example, user Joe Smith won each of the three parts of his wager. The user's wallet information in the user database 110 is then updated, at step 318, to reflect the result of the wager. In this example, user Joe Smith has a starting balance of $500. His initial wager was $100 (at even money) that Julio Jones would catch a pass on the play. He indicated that the pass would be over 10 yards (at −200) for his tier 2 wager. He indicated that Julio Jones would not score on the play (−400). In this example, user Joe Smith has made three independent $100 wagers, one at even money, one at −200, and one at −400. The first wager would pay out $100 on top of his initial wager, the second $50 and the third $25, bringing his account balance from $500 to $675. While in this embodiment each wager tier is an independent betting event, the wagers could be combined in one of the many ways known in the art, such as a parlay or multiplier. The module then determines, at step 320, if the live event 102 was concluded. If the live event 102 is not concluded, the module returns to step 308. If the live event 102 has concluded, or the user has logged off the wagering app 128, the program ends, at step 322.

Figure 4:
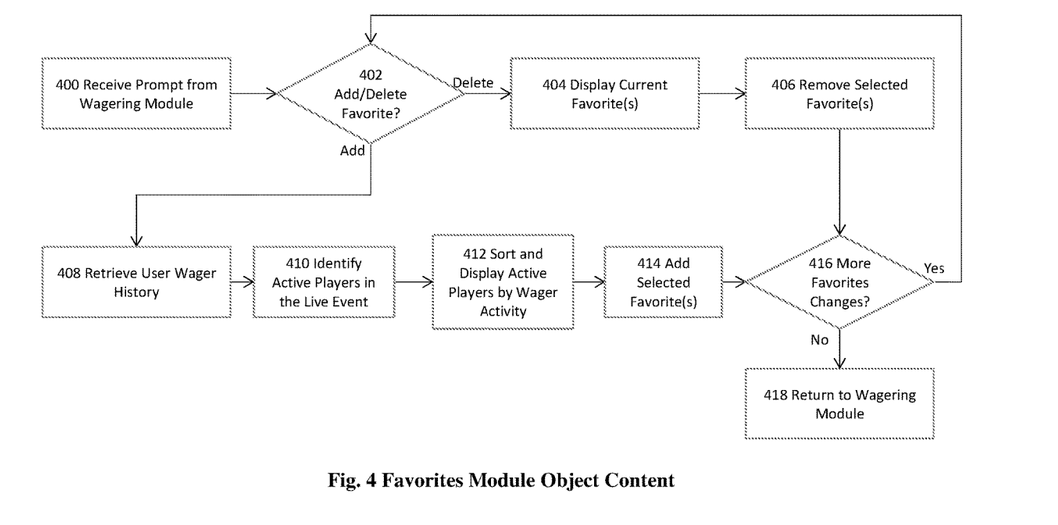
FIG. 4 illustrates a favorites module, according to an embodiment.

FIG. 4 illustrates the favorites module 120. The process begins with receiving a prompt, at step 400 from the wagering module 118 that the user needs to create a favorites list because they have not yet created one, or they have indicated they want to add to or change their favorites list. The user then indicates, at step 402, if they wish to add to their favorites list or delete players from their favorites list. If the user indicates, at step 402, that they wish to add player(s) to the favorites list, the module proceeds to step 408. If the user indicates, at step 402, that they wish to delete player(s) from their favorites list, their favorites list is retrieved from the user database 110 and displayed, at step 404, on the user's mobile device 126. The player(s) indicated by the user are removed, at step 406, from their favorites list in the user database 110, and the module proceeds to step 416. If the user indicates, at step 402, that they wish to add player(s) to the favorites list, the user's wager history is retrieved, at step 408, from the user database 110. The players active in the live event 102 are identified, at step 410. The active players in the live event 102 are compared to the user's wager history to identify the active players the user has wagered on in the past, which are then sorted by how often the user has wagered on each player in the past and displayed, at step 412, on the mobile device 126 with the most frequently wagered upon players at the top of the list. User selected player(s) from the list are added, at step 414, to the user's favorites list in the user database 110. The module then receives, at step 416, an indication from the user if they need to make additional changes to their favorites list. If more changes are needed, the module returns to step 402. If no additional changes are indicated by the user at step 416, the process returns, at step 418 to the wagering module 118.

Figure 5:
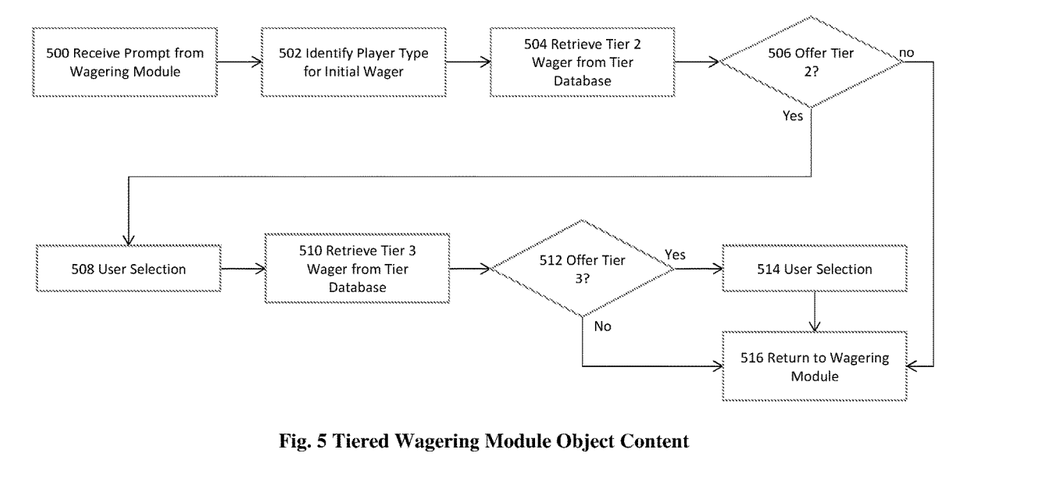
FIG. 5 illustrates a tiered wagering module, according to an embodiment.

FIG. 5 illustrates the tiered wagering module 122. The process begins with receiving, at step 500, a prompt from the wagering module 122 that the user has indicated a wager selection. In this example user Joe Smith indicated a wager of $100 on Julio Jones catching a pass on the next play of the live event 102 at even money. The player type of the wagered upon player is identified, at step 502. In this example the wagered upon player, Julio Jones, is a receiver in an NFL game. The tier 2 wager options for the identified player type are retrieved, at step 504 from the tier database 124. The user's initial wager, in this example that Julio Jones will catch a pass, is compared to the conditions for tier 2 wagers in the tier database 124 to determine, at step 506 if a tier 2 wager option is displayed on the mobile device 126. In this example, the tier 2 wager options for a wager that a receiver in an NFL game will catch a pass, is an over/under bet. The distance of the over/under, in this example ten yards, is determined by the odds calculation module 112 based on information in the historical plays database 114. If the user Joe Smith had wagered against Julio Jones making a catch, there would be no tier 2 wagered offered and the process would proceed to step 516. The user's wager selection is received, at step 508. If the user indicates not taking the tier 2 wager the process proceeds to step 516. The tier 3 wager options available based on the user's indication on the tier 2 wager is retrieved, at step 510 from the tier database 124. The user's tier 2 wager, in this example that Julio Jones will catch a pass for over ten yards, is compared to the conditions for tier 3 wagers in the tier database 124 to determine, at step 512 if a tier 3 wager option is displayed on the mobile device 126. In this example, the tier 3 wager options for a wager that a receiver in an NFL game will catch a pass for over the over/under threshold, is a yes/no wager on a touchdown. If the user Joe Smith had wagered that Julio Jones a catch for under the over/under threshold, there would be no tier 3 wagered offered and the process would proceed to step 516. The user's wager selection is received, at step 514. If the user indicates not taking the tier 3 wager the process proceeds to step 516. When the user's wager selections are complete, the module returns, at step 516 to the wagering module 118.

Figure 6:
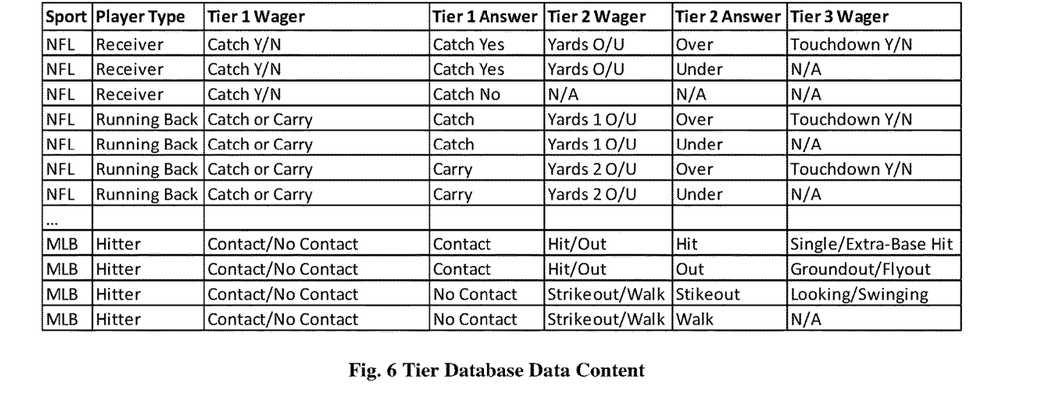
FIG. 6 illustrates a tier database, according to an embodiment.

FIG. 6 illustrates the tier database 124. The database contains the rules used by the tier wagering module 122 to determine which wagers to offer a user based on their response to a previously offered wager. In this embodiment the rules are broken up first by sport, such as American football, baseball, basketball, etc., then by player type, such as receiver or running back in football or a hitter or pitcher in baseball, etc. These categories of player then each have tiers of wagers, in this example there are three tiers of wagers. For a hitter in a baseball game the initial wager option could be contact/no contact. If the user indicates no contact on the tier 1 wager, they are presented with walk/strikeout as tier 2 wager options. If the user indicates a walk there is no tier 3 wager, while if they indicate strikeout for the tier 2 wager, they are presented with looking/swinging for the tier 3 wager. While in this example an at-bat is used as the play interval for the wagers offered, wagers in baseball could also be made pitch to pitch, inning to inning, etc. For a running back in football the first tier wager could be the user indicating the player will catch the ball on a passing play or carry the ball on a running play. Each response has an over/under wager associated with it; this is the second tier wager. While this situation has the same wager type, an over/under, in tier 2 the wagers would potentially be for different yardages due to the different play type, run/pass. If the user selects the under for either option, there is no tier 3 option. If the user indicates the over, an option to wager yes/no on the player scoring a touchdown is presented as the tier 3 wager.

The foregoing description and accompanying figures illustrate the principles, preferred embodiments and modes of operation of those embodiments. However, the embodiments should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system for wagering on multiple elements of a single play of a live sporting event related to a player of interest, comprising:
    a wagering network configured to host in-play wagering on live sporting events;
    a user database comprising a plurality of user preferences; and
    an automated content recognition (ACR) system communicatively coupled with a database and configured to compare a plurality of data and/or media files from the live sporting events to a plurality of reference fingerprints in the database and/or one or more sensors communicatively coupled with the database and configured to obtain sensor data and transmit the sensor data to the database;
    wherein the ACR system is configured to identify, in a live sporting event, at least one matching reference fingerprint and/or a processor is configured to process and compare the sensor data in the database;
    wherein the system is configured to provide odds for wagers on multiple potential outcomes for single plays inside of the live sporting event;
    wherein the system is configured to provide, on the wagering network, wagers on potential outcomes for a favorite player in a play of a live sporting event, wherein identification of said potential outcomes is based on the at least one matching reference fingerprint and/or compared sensor data;
    wherein the system is configured to receive, from the user, a first selection of a wager, and is configured to construct, based on the first selection of the wager, a tiered wager, wherein constructing the tiered wager comprises:
        upon the first selection of the wager, comparing the first selection of the wager to a plurality of possible wagers;
        retrieving, from the plurality of possible wagers, a further wagering option, based on a determination that the further wagering option overlaps the first selection of the wager; and
        receiving a user determination to add the further wagering option to the first selection of the wager to provide the tiered wager;

and
wherein the system is configured to perform polling of wagering information on a play-by-play basis and resolve a wager on a potential outcome in the play of the live sporting event upon determination of a play result.

2. The system for wagering of claim 1, further comprising a favorites module housing the user preferences.

3. The system for wagering of claim 2, wherein the favorites module is populated with one or more favorite players.

4. The system for wagering of claim 3, wherein the one or more favorite players are at least one of: selected by a user and edited by the user.

5. The system for wagering of claim 3, wherein the one or more favorite players are determined by the favorites module.

6. The system for wagering of claim 1, wherein the system is further configured to provide, on the wagering network, additional wager options based on previous wager options by the user.

7. The system for wagering of claim 6, wherein the system is further configured to, upon receiving a predetermined number of wagers on a non-favorite player, automatically add the non-favorite player as a new favorite player in the favorites module and provide, with the wagering network, additional wager options associated with the new favorite player.

8. The system for wagering of claim 1, wherein the wagering network provides more wager options for the favorite player than for a non-favorite player.

9. A computer implemented method for providing wagering on multiple elements of a single play of a live sporting event related to a player of interest, comprising executing on a processor the steps of:
displaying a gambling game on a device;
determining if one or more favorite players have been identified, prompting a selection of the one or more favorite players in a case where no favorite players have been identified, and displaying the one or more favorite players;
displaying one or more first wager options for at least one favorite player in play in a live sporting event;
receiving, on the device, a first selection of a wager from the one or more first wager options, and constructing, based on the first selection of the wager, a tiered wager, wherein constructing the tiered wager comprises:
upon the first selection of the wager, comparing the first selection of the wager to a plurality of possible wagers;
retrieving, from the plurality of possible wagers, a further wagering option, based on a determination that the further wagering option overlaps the first selection of the wager; and
receiving a user determination to add the further wagering option to the first selection of the wager to provide the tiered wager;
displaying one or more wagers placed on the at least one favorite player in the play in the live sporting event;
polling wagering information on a play-by-play basis; and
comparing, with an automated content recognition (ACR) system and/or one or more sensors communicatively coupled with a database, at least one of a data file, a media file, and/or sensor data from the live sporting event to a plurality of reference fingerprints or sensor data in the database, identifying at least one outcome related to the one or more wagers based on a comparison between the at least one data file, media file, and/or sensor data and the plurality of reference fingerprints and/or sensor data in the database, and resolving at least one of the one or more wagers based on and upon determination of the at least one outcome.

10. The computer implemented method of claim 9, further comprising displaying a sortable list of favorite players.

11. The computer implemented method of claim 9, further comprising displaying a list of favorite players organized by a sport played by the favorite player.

12. The computer implemented method of claim 9, further comprising displaying a list of favorite players organized by a number of wagers placed on each player in the list of favorite players.

13. The computer implemented method of claim 9, further comprising displaying a list of players that can be selected as favorite players.

14. The computer implemented method of claim 9, further comprising displaying results of the one or more wagers placed on the at least one favorite player for the play in the live sporting event.

* * * * *